US009382875B2

(12) United States Patent
Kramer et al.

(10) Patent No.: US 9,382,875 B2
(45) Date of Patent: *Jul. 5, 2016

(54) SPHERICAL BUTTON WASHER FOR EXHAUST DUCT LINER HANGER

(75) Inventors: George J. Kramer, Tolland, CT (US); Jeffrey S. Smith, Storrs, CT (US)

(73) Assignee: United Technologies Corporation, Horton, CT (US)

(*) Notice: Subject to any disclaimer, the term of this patent is extended or adjusted under 35 U.S.C. 154(b) by 677 days.

This patent is subject to a terminal disclaimer.

(21) Appl. No.: 13/586,638

(22) Filed: Aug. 15, 2012

(65) Prior Publication Data

US 2014/0047849 A1    Feb. 20, 2014

(51) Int. Cl.
F02K 1/80 (2006.01)
F02K 1/82 (2006.01)
F02C 7/20 (2006.01)

(52) U.S. Cl.
CPC ... F02K 1/80 (2013.01); F02C 7/20 (2013.01); F02K 1/82 (2013.01); *Y10T 29/49323* (2015.01)

(58) Field of Classification Search
CPC .............. F23R 3/60; F23R 3/283; F23R 3/06; F23R 3/002; F23R 2900/03044; F01D 9/023; F01D 9/041; F01D 9/042; F01D 9/044; F02C 7/20; Y02T 50/671; Y02T 50/675; Y02T 29/49323; F02K 1/822; F02K 1/80; F02K 1/82; B23P 15/006; B23P 15/04
USPC ........ 60/798, 799; 403/220–229; 239/265.33, 239/265.37, 265.39; 29/899.22
See application file for complete search history.

(56) References Cited

U.S. PATENT DOCUMENTS

| | | | |
|---|---|---|---|
| 3,737,975 A * | 6/1973 | McKinnon, Jr. | 29/421.1 |
| 5,059,055 A | 10/1991 | DeGress et al. | |
| 5,265,409 A | 11/1993 | Smith, Jr. et al. | |
| 7,017,334 B2 * | 3/2006 | Mayer et al. | 60/266 |
| 7,581,399 B2 | 9/2009 | Farah et al. | |
| 7,721,522 B2 | 5/2010 | Farah et al. | |
| 7,788,899 B2 | 9/2010 | Smith | |
| 7,854,586 B2 | 12/2010 | Major et al. | |
| 7,861,535 B2 | 1/2011 | Figueroa et al. | |
| 7,866,158 B2 | 1/2011 | Murphy | |
| 8,127,526 B2 | 3/2012 | Murphy et al. | |
| 2007/0003411 A1 * | 1/2007 | Manzoori | 415/173.2 |
| 2008/0061210 A1 * | 3/2008 | Carnevali | 248/447 |
| 2009/0293498 A1 * | 12/2009 | Petty | F01D 25/28 60/796 |
| 2009/0317175 A1 * | 12/2009 | Martinez | 403/24 |
| 2011/0016880 A1 | 1/2011 | Roberts et al. | |

FOREIGN PATENT DOCUMENTS

DE          EP0972905 A2 *    1/2000

* cited by examiner

Primary Examiner — Ehud Gartenberg
Assistant Examiner — Jared W Pike
(74) Attorney, Agent, or Firm — Kinney & Lange, P.A.

(57) ABSTRACT

A hanger for suspending a liner within an exhaust duct of a gas turbine engine comprises a bracket, a washer, a rod and a cap. The bracket is for connection to an exhaust duct liner of a gas turbine exhaust system. The washer is connected to the bracket at a slip joint. The rod is connected to the washer at a ball joint. The cap for is for connecting to an exhaust duct of the gas turbine exhaust system. The cap is connected to the rod.

21 Claims, 3 Drawing Sheets

SPHERICAL BUTTON WASHER FOR EXHAUST DUCT LINER HANGER

CROSS-REFERENCE TO RELATED APPLICATION(S)

The following co-pending application filed on the same day as this application is hereby incorporated by reference: "PIVOTING BALL STOP FOR EXHAUST DUCT LINER HANGER" by inventors G. Kramer and S. Kramer, U.S. patent application Ser. No. 13/568,627.

BACKGROUND

This invention relates generally to gas turbine engines and more particularly to exhaust duct liner attachment systems and methods. In gas turbine engines, it is necessary to protect exhaust ducts with an insulating shield in order to prevent heated core gases from damaging the exhaust ducts. Typically, exhaust ducts are made from titanium-based alloys and have temperature limits of approximately 300°-600° F. (~148.9°-315.6° C.). Exhaust gases, however, reach much higher temperatures. It is, therefore, necessary to line exhaust ducts with a material that is capable of withstanding the peak temperatures of the core gases and that prevents the exhaust duct from reaching its temperature limitations. Exhaust duct liners are typically made from nickel-based alloys, which have temperature limits of approximately 700°-1500° F. (~371.1°-815.6° C.). In order to alleviate some of the heat from the exhaust gases imparted to the liner, cooling air is passed between the exhaust duct and liner. For example, bypass air is routed between the duct and liner in turbofan engines. Thus, the exhaust duct and liner are subjected to different pressure and temperature gradients, which results in differing deflections and expansions of each body.

In order to maintain the desired temperature and pressure profile along the exhaust duct and liner, it is desirable to maintain proper spacing between the exhaust duct and liner. The differing pressures, temperatures and functional requirements of the exhaust duct, however, produce three-dimensional forces between the duct and liner, which tend to shift the liner out of alignment. Various designs have been put forth to maintain proper alignment, such as described in U.S. Pat. Nos. 7,581,399 and 7,681,535, which are assigned to United Technologies Corporation. Some of these designs, however, require careful insertion of support members through holes in either the exhaust duct or liner. There is, therefore, a need for an easy to install exhaust duct liner suspension system that maintains proper spacing between an exhaust duct and a duct liner, while also permitting the liner to shift in other directions to accommodate, among other things, thermal growth.

SUMMARY

A hanger for suspending a liner within an exhaust duct of a gas turbine engine comprises a bracket, a washer, a rod and a cap. The bracket is for connection to an exhaust duct liner of a gas turbine exhaust system. The washer is connected to the bracket at a slip joint. The rod is connected to the washer at a ball joint. The cap for is for connecting to an exhaust duct of the gas turbine exhaust system. The cap is connected to the rod.

DETAILED DESCRIPTION

Figure 1:
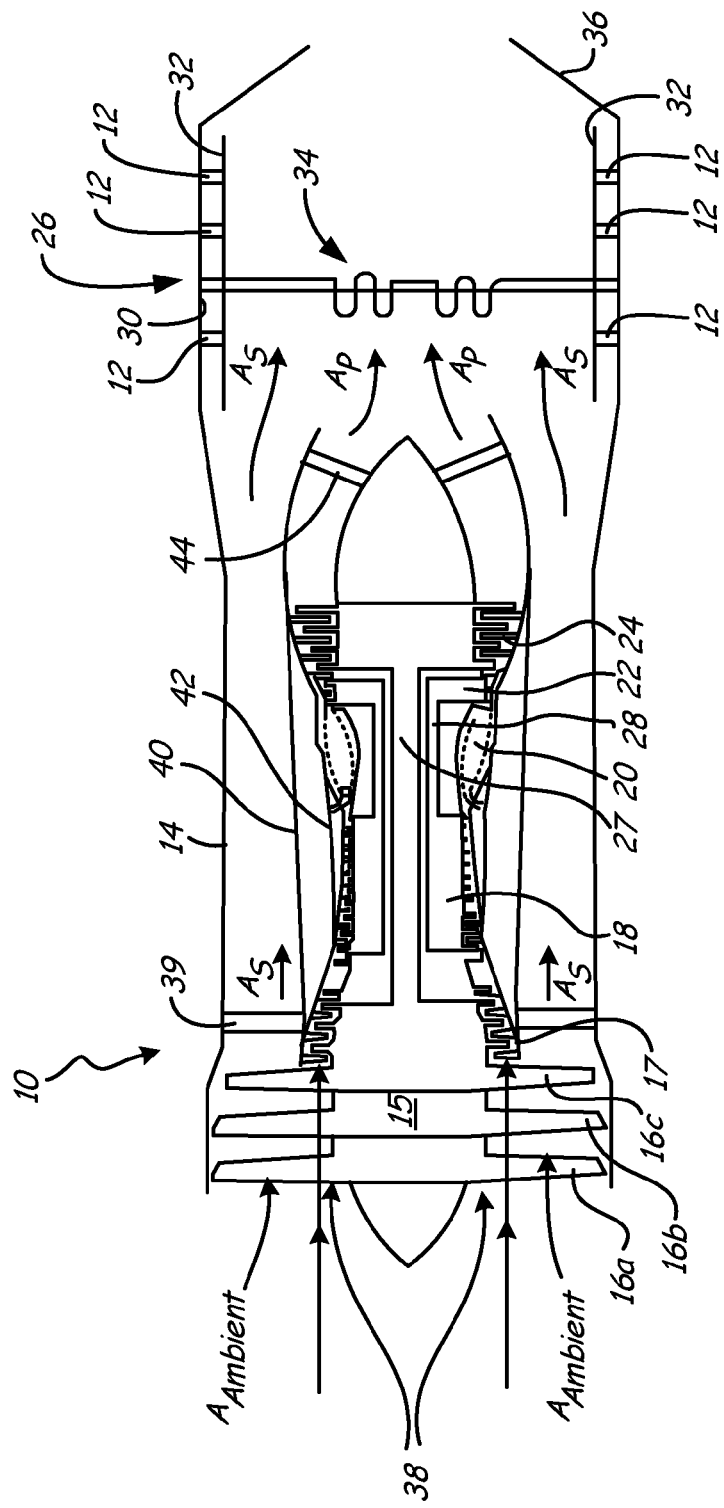
FIG. 1 is a schematic diagram of a dual-spool, low-bypass ratio turbofan engine having an exhaust duct liner supported within an exhaust duct using hangers having spherical button washers of the present invention.

FIG. 1 shows a schematic diagram of dual-spool, low-bypass ratio turbofan engine 10, in which hangers 12 of the present invention can be used. Although, in other embodiments, the present invention is applicable to other types of gas turbine engines such as high-bypass ratio turbofans including turbofans using fan drive gear systems. Turbofan engine 10 also includes fan duct 14, drive fan 15 (including stages 16a-16c), low pressure compressor 17, high pressure compressor 18, combustor 20, high pressure turbine 22, low pressure turbine 24 and exhaust system 26. Drive fan 15 and low pressure compressor 17 are driven by low pressure turbine 24 with shaft 27. High pressure compressor 18 is driven by high pressure turbine 22 with shaft 28. High pressure compressor 18, combustor 20, high pressure turbine 22 and shaft 28 comprise the core of turbofan engine 10, which produces the high energy air stream that is ultimately used to drive low pressure turbine 24 and provide high pressure flow to produce thrust via both primary air $A_P$ and secondary air $A_S$. Exhaust system 26 includes exhaust duct 30, liner 32, augmentation system 34 and exhaust nozzle 36. Exhaust system 26 also includes hangers 12, which include spherical button washers of the present invention. Hangers 12 are disposed in multiple circumferential arrays to maintain liner 32 mounted within exhaust duct 30. FIG. 1 shows three, axial sequential arrays of hangers 12. However, liner 32 may be supported by many more arrays wherein the total number of hangers numbers in the hundreds.

Ambient air $A_{Ambient}$ enters engine 10 at inlet 38 through drive fan 15. Drive fan 15 is rotated by low pressure turbine 24 to accelerate ambient air $A_{Ambient}$ thereby producing a major portion of the thrust output of engine 10. Accelerated ambient air $A_{Ambient}$ is divided into two streams of air: primary air $A_P$ and secondary air $A_S$. Secondary air $A_S$, also known as bypass air, passes through fan exit guide vanes 39 and between fan duct 14 and aft duct 40 where it passes on to exhaust system 26. Thus, the principal function of secondary air $A_S$ is the production of thrust from drive fan 15. Secondary air $A_S$ also serves to cool exhaust duct liner 32 from primary air $A_P$. Primary air $A_P$, also known as hot air, is a stream of air that is directed first into low pressure compressor 17 and then into high pressure compressor 18 within engine case 42. Pressurized primary air $A_P$ is then passed into combustor 20 where it is mixed with a fuel supply and ignited to produce high energy gases, as is known in the art. The high energy gasses are used to turn high pressure turbine 22 and low pressure turbine 24. Turbine 22 drives compressor 18 with shaft 28, while turbine 24 drives compressor 17 and drive fan 15 with shaft 27. Primary air $A_P$ passes from engine case 42 to exhaust system 26 through exit guide vanes 44.

Mixed combusted primary air $A_P$ and bypassed secondary air $A_S$ are passed into exhaust duct 30 of exhaust system 26. As is known in the art, a secondary combustion process can be carried out using augmentation system 34 within liner 32. The augmentation process elevates the speed and temperature of the mixed exhaust gas to further produce thrust using exhaust nozzle 36. Liner 32, which is suspended from exhaust duct 30 with hangers 12, prevents overheating of duct 30 from the secondary combustion process. Hangers 12 allow liner 32 to shift within exhaust duct 30 to accommodate different thermal expansion rates between liner 32 and duct 30, while accommodating different temperature gradients throughout exhaust system 26. Hangers 12 incorporate spherical button washers that permit radial, circumferential and axial displacement of liner 32 within duct 30 without inducing additional stress. The spherical button washers of hangers 12 also facilitate expedient assembly of liner 32 within exhaust duct 30.

Figure 2:
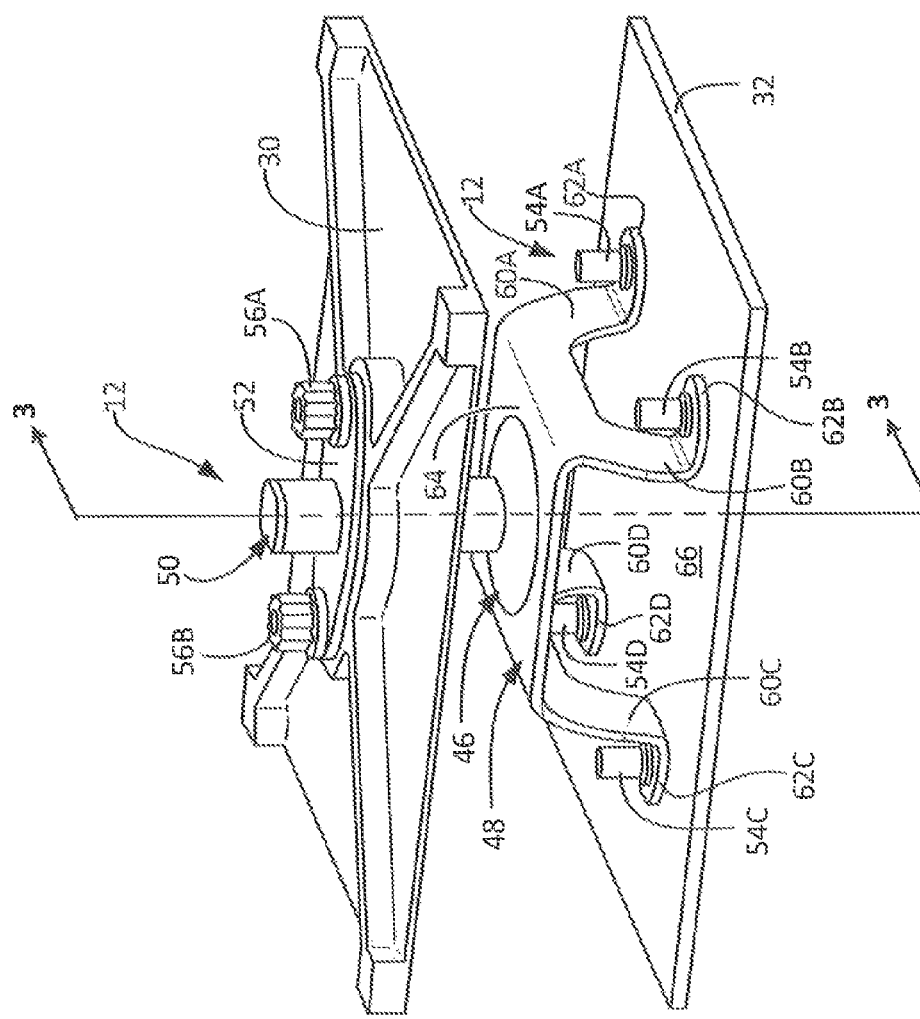
FIG. 2 is a perspective view of a hanger having a spherical button washer of the present invention connecting a cut-away portion of an exhaust duct with a cut-away portion of an exhaust duct liner.

FIG. 2 is a perspective view of hanger 12 of FIG. 1 having spherical button washer 46. As illustrated, hanger 12 connects a cut-away portion of exhaust duct 30 with a cut-away portion of liner 32. Hanger 12 also includes bracket 48, retainer rod 50 and cap 52. Bracket 48 is coupled to liner 32 by studs 54A-54D. Cap 52 is coupled to exhaust duct 30 by fasteners 56A and 56B. Spherical button washer 46 is secured to a bore extending through bracket 48. Retainer rod 50 is threaded into cap 52 and joins to spherical button washer 46. Spherical button washer 46 includes a spherical button over which retainer rod 50 fits to join exhaust duct 30 with liner 32 in a rotatable fashion.

Bracket 48 provides a body for rigidly joining to liner 32 and spherical button washer 46. Bracket 48 comprises a sheet metal piece that is cut and bent into an elevated-platform shape having legs 60A-60D, feet 62A-62D and platform 64. Legs 60A-60D and feet 62A-62D are bent at various angles to elevate or space platform 64 from liner 32. Each of legs 60A-60D and each of feet 62A-62D can be, respectively, bent at the same or different angles, depending on the shape, contour and surface geometry of liner 32. In the disclosed embodiment, legs 60A-60D are bent generally perpendicular to platform 64 to provide height to bracket 48. Feet 62A-62D are bent generally perpendicular to legs 60A-60D so as to be generally parallel to platform 64. Feet 62A-62D include bores (not shown) for receiving studs 54A-54D, respectively. Studs 54A-54D are joined to outer diameter surface 66 of liner 32 so as to not interfere with flow of primary air $A_P$ (FIG. 1) within liner 32. For example, studs 54A-54D can be welded to surface 66. Bracket 48 provides spacing of platform 64 from liner 32 so as to accommodate assembly of spherical button washer 46. Bracket 48 can be made using a numerically controlled break machine, thereby eliminating the need for expensive form tooling.

Cap 52 provides a body for rigidly joining to exhaust duct 30 and retainer rod 50. As discussed in greater detail with reference to FIG. 3, retainer rod 50 is split into two halves. After retainer rod 50 is inserted through exhaust duct 30 and joined to spherical button washer 46, cap 52 is slipped around split retainer rod 50 and joined to exhaust duct 30 using fasteners 56A and 56B. Cap 52 holds pieces of split rod 50 together and provides stiffening to retainer rod 50 to facilitate coupling between retainer rod 50 and spherical button washer 46. As will be discussed in greater detail later, retainer rod 50 is able to rotate and pivot on spherical button washer 46 to permit deformation of liner 32 due to, among other things, build tolerances within exhaust duct 30. The deformations also produce local axial and circumferential displacement between exhaust duct 30 and liner 32. Spherical button washer 46 is able to axially and circumferentially slide along platform 64, thereby allowing liner 32 to move axially and circumferentially with respect to exhaust duct 30. As such, hanger 12 does not induce axial and circumferential strain within liner 32 during deformation and displacement.

Figure 3:
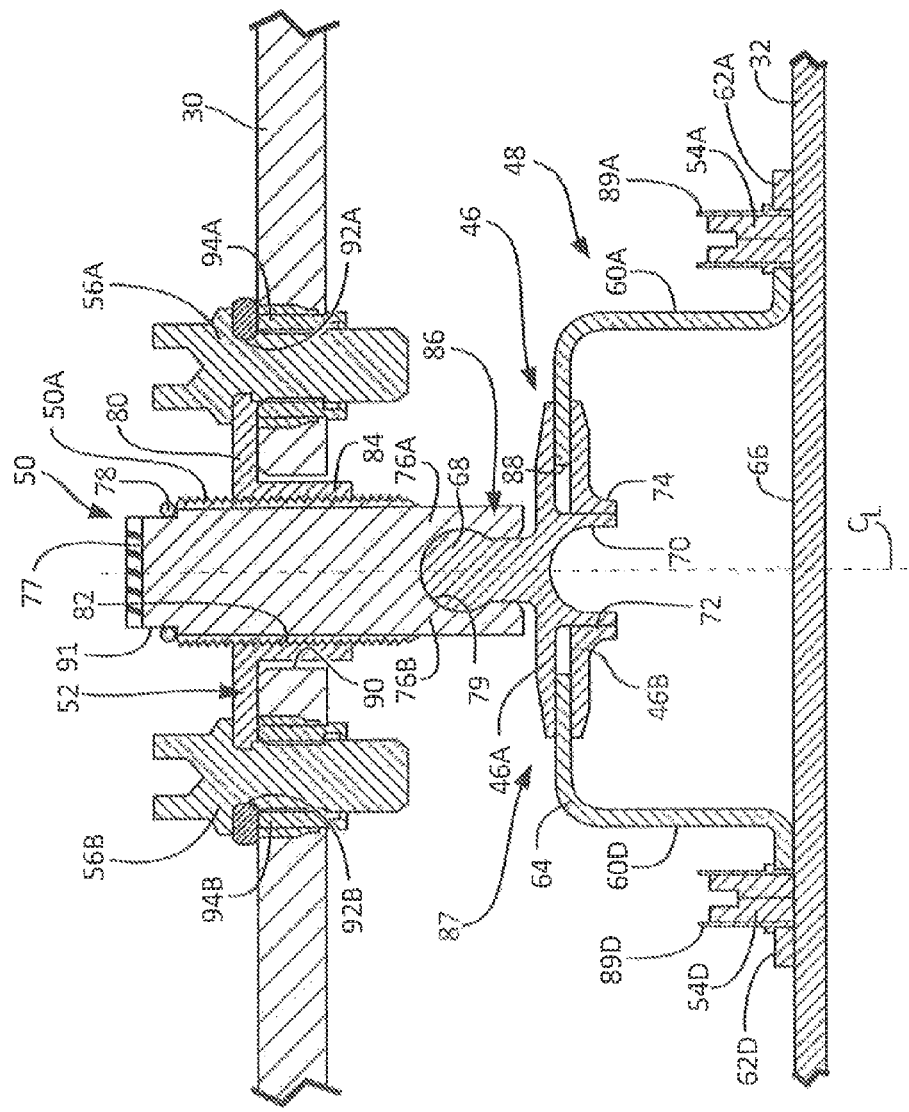
FIG. 3 is a side cross-sectional view of the hanger of FIG. 2 showing a spherical button washer of the present invention forming a slip joint and a ball joint between a bracket and a rod.

FIG. 3 is a side cross-sectional view of hanger 12 showing upper disk 46A and lower disk 46B of spherical button washer 46. Upper disk 46A includes spherical button 68 and post 70. Lower disk 46B includes post bore 72 and post collar 74. Retainer rod 50 includes first section 76A, second section 76B, cap 77 and clip 78. First and second sections 76A and 76B comprise circumferential segments of retainer rod 50 that mate together to form a generally cylindrical body having socket 79. Cap 52 includes plate 80, rod bore 82 and rod collar 84. Spherical button 68 and socket 79 form ball joint 86, while slip joint 87 is formed by disks 46A and 46B and slide bore 88.

As discussed above, studs 54A and 54D are joined to liner 32 so as to extend radially outward from outer surface 66. Studs 54A and 54D pass through bores in feet 62A and 62D, respectively. Studs 54A and 54D include collars 89A and 89D that maintain feet 62A and 62D engaged with surface 66, thereby preventing bracket 48 from slipping off of studs 54A and 54D. Platform 64 includes slide bore 88 to which spherical button washer 46 is joined. Disks 46A and 46B comprise opposing plates that sandwich platform 64. Specifically, post 70 is inserted into slide bore 88 so that upper disk 46A is adjacent platform 64. As such, spherical button 68 extends radially outward from liner 32. Slide bore 88 is larger in diameter, or wider as shown in FIG. 3, than post 70. Bore 72 of lower disk 46B is fitted around post 70 so that lower disk 46B is adjacent the underside of platform 64. Collar 74 of lower disk 46B is joined to post 70 of upper disk 46A, such as via welding, at a radial position so as to not clamp down on platform 64. In other words, the gap between upper disk 46A and lower disk 46B is greater than the thickness of platform 64 of bracket 48. As such, after upper disk 46A and lower disk 46B are joined, spherical button washer 46 is free to slip within slide bore 88. The diameter of slide bore 88 is determined based on design needs and can be enlarged or reduced to enhance or limit relative movement as needed. Spherical button washer 46 is pre-assembled with bracket 48 before liner 32 is assembled to exhaust duct 30.

After liner 32 and bracket 48 are inserted into exhaust duct 30, retainer rod 50 is inserted through bore 90 within exhaust duct 30 to couple with spherical button washer 46. Specifically, first and second sections 76A and 76B are pushed down (with reference to the orientation of FIG. 3) to engage spherical button 68. The continuous application of force to retainer rod 50 drives spherical button 68 between first and second sections 76A and 76B, splitting them apart until socket 79 fits around spherical button 68. Sections 76A and 76B are formed of sufficiently rigid material, such as high-strength, high-heat-resistance steel, nickel or titanium. In the disclosed embodiment, sections 76A and 76B comprise one-hundred-eighty degree segments of retainer rod 50. Cap 77 and clip 78 are positioned at torque feature 91, which forms a shelf upon which clip 78 can rest. Torque feature 91 comprises opposing slab sides or a hex feature so that a wrench or torque tool can be applied to retainer rod 50. Cap 77 is used to maintain section 76A and 76B assembled to each other as a single unit to facilitate assembly with cap 52. In one embodiment, cap 77 comprises a rubber sheet that forms a resilient hinge between sections 76A and 76B. Alternatively, clip 78 applies spring-force to first and second sections 76A and 76B thereby pulling the two bodies into engagement. Clip 78 is deformable to permit sections 76A and 76B to open up and pivot, but is also resilient to pull sections 76A and 76B back together. Cap 77 and clip 78 are used exclusively of each other, but are shown together for illustrative purposes. In any embodiment, sections 76A and 76B are brought back together after spherical button 68 aligns with socket 79. Assembled as such, retainer rod 50 is free to rotate and tilt about spherical button 68 within bore 90. Assembly of retainer rod 50 with spherical button washer 46 does not require that bracket 48 or spherical button 68 be precisely aligned with bore 90 in axial or circumferential directions. The gap between post 70 and slide bore 88 allows for some misalignment. Further, assembly of retainer rod 50 does not require the axial insertion of any tools or rigging in the small space between exhaust duct 30 and liner 32 to assemble hanger 12.

Collar 84 of cap 52 is positioned around retainer rod 50. In one embodiment, collar 84 is threaded onto retainer rod 50 at threads 50A. Collar 84 is threaded onto retainer rod 50 until plate 80 is positioned adjacent exhaust duct 30 such that collar 84 extends into bore 90. Collar 84 extends across a length of retainer rod 50 so as to trap first and second sections 76A and 76B of retainer rod 50 in tight engagement, thereby maintaining socket 79 engaged with spherical button 68. Collar 84 thereby strengthens the engagement of sections 76A and 76B provided by cap 77 or clip 78. Cap 52 is rotated into position such that fastener bores 92A and 92B align with self-locking inserts 94A and 94B, which are inserted into bores within exhaust duct 30. Fasteners 56A and 56B are threaded or otherwise inserted into self-locking inserts 94A and 94B to retain plate 80 against the outer diameter surface of exhaust duct 30. Assembly of cap 52 with retainer rod 50 does not require precise alignment of bracket 48. For example, as collar 84 is positioned around sections 76A and 76B, ball joint 86 and slip joint 87 permit movement of spherical button washer 46 relative to bracket 48. Also, variations in the radial distance between liner 32 and exhaust duct 30 can be accommodated by the threading of retainer rod 50 into collar 84. Specifically, retainer rod 50 can be threaded into collar 84 to accommodate the full tolerance range of the desired distance between liner 32 and exhaust duct 30. Thus, the use of shims is eliminated as has been required of prior art designs.

During operation of turbofan engine 10 (FIG. 1), various temperature gradients within exhaust system 26 (FIG. 1), produce local stresses and strains within liner 32. Liner 32 is thereby subject to local distortions and displacements. Slip joint 87 and ball joint 86 of the present invention prevent additional stress and strain from hanger 12 from being induced in liner 32. However, slip joint 87 and ball joint 86 also permit hanger 12 to absorb radial compressive and radial tensile loading, such as when liner 32 moves away from and toward duct 30. As liner 32 tends to deform from loading and thermal gradients, hangers 12 distributed circumferentially around liner 32 allow exhaust duct 30 to react those loads to maintain the shape of liner 32 without hangers 12 inducing their own strain into liner 32. For example, as liner 32 rotates and shifts with reference to duct 30 in FIG. 3, the clearance between spherical button washer 46 and bracket 48 allows axial and circumferential slippage. Retainer rod 50 neither pulls nor pushes on liner 32 to accommodate such movement due to slip joint 87. However, upper and lower disks 46A and 46B of spherical button washer 46 will maintain radial spacing between exhaust duct 30 and liner 32 for compressive and tensile stress situations, thereby retaining the shape of liner 32 and optimal performance. Spherical button washer 46 is thus well suited for use in exhaust systems having circular or non-axi-symmetric exhaust ducts and liners.

Hanger 12 is a simple to use system that facilitates easy installation. With the present invention, the use of tools or rigging to assemble retainer rod 50 is not required. Spherical button washer 46 only requires one ball joint, thereby reducing the weight, complexity and number of parts as compared to prior art designs. Cap 52 and bracket 48 require only a small footprint on exhaust duct 30 and liner 32, thereby enabling the use of a greater quantity of hangers 12 if desired. Further, disks 46A and 46B decouple rigid connection between cap 52 and bracket 46 thereby providing a damping function. For example, the introduction of one or more degrees of freedom in movement between bracket 48 and washer 46 reduces the likelihood of hanger 12 vibrating at resonance.

The following are non-exclusive descriptions of possible embodiments of the present invention.

A hanger for use in a gas turbine engine exhaust system, the hanger comprises a bracket for connection to an exhaust duct liner of the gas turbine exhaust system; a washer connected to the bracket at a slip joint; a rod connected to the washer at a ball joint; and a cap for connecting to an exhaust duct of the gas turbine exhaust system, the cap connected to the rod.

The hanger of the preceding paragraph can optionally include, additionally and/or alternatively, any one or more of the following features, configurations and/or additional components:

A hanger wherein the bracket comprises: a platform; and a slide bore extending through the platform and to which the washer is connected.

A hanger wherein the bracket further comprises: a plurality of legs extending from the platform; and a plurality of feet spaced from the platform by the plurality of legs.

A hanger wherein the washer comprises: an first disk adjacent a first side of the platform; a post extending from the first disk through the slide bore; a second disk adjacent a second side of the platform; a post bore extending through the second disk and surrounding the post; wherein the second disk is spaced from the first disk and the slide bore is wider than the post to form the slip joint.

A hanger wherein the second disk further comprises a post collar surrounding the post.

A hanger wherein the washer includes a radially outwardly extending spherical button; and the rod includes a radially inwardly extending socket that receives the spherical button to form the ball joint.

A hanger wherein the rod comprises: a pair of rod sections each forming a portion of the socket; and a retainer that holds the pair of rod sections together.

A hanger wherein the retainer is selected from the group consisting of a cap and a clip.

A hanger wherein the rod is threaded into the cap.

A hanger wherein the cap comprises: a plate for engaging the exhaust duct; a rod bore extending through the plate; and a collar surrounding the rod bore to receive the rod.

A suspension system comprising: an exhaust duct of a gas turbine engine; an exhaust duct liner disposed within the exhaust duct; a rod comprising: a first end having a threaded shaft; and a second end having a socket; a washer comprising: a first plate having a button joined to the socket; and a second plate spaced from the first plate to define a gap; a bracket joined to the exhaust duct liner, the bracket having a slide bore inserted into the gap; and a cap joined to the exhaust duct, the cap having a rod collar that receives the rod.

The suspension system of the preceding paragraph can optionally include, additionally and/or alternatively, any one or more of the following features, configurations and/or additional components:

A suspension system wherein the bracket comprises: a platform through which the slide bore extends; a plurality of legs extending from the platform; and a plurality of feet spaced from the platform by the plurality of legs.

A suspension system wherein the washer further comprises: a post extending from the first plate opposite the button; a bore extending through the second plate and surrounding the post; and a post collar on the second plate surrounding the bore; wherein the post is joined to the post collar to define the gap.

A suspension system wherein the rod comprises: a pair of circumferential rod sections each forming a portion of the socket and the threaded end; and a retainer that holds the pair of rod sections together; wherein the pair of rod sections are threaded into the rod collar.

A suspension system wherein the cap comprises: a plate fastened to the exhaust duct; and a bore extending through the plate around which the rod collar is disposed.

A method for assembling a suspension system for hanging and exhaust duct liner within an exhaust duct of a gas turbine engine comprising: joining a spherical button to a liner bracket at a slip joint; coupling a socket of a rod to the spherical button; and threading a cap around the rod.

The method of the preceding paragraph can optionally include, additionally and/or alternatively, any one or more of the following features, configurations, steps and/or additional components:

A method further comprising: joining the liner bracket to studs of an exhaust duct liner; and joining the cap to the exhaust duct with fasteners.

A method further comprising: splitting the rod to fit the spherical button into the socket.

A method further comprising: pre-assembling the washer to the bracket by joining opposing plates to opposite sides of the bracket.

An exhaust duct liner suspension system comprises: a washer comprising: a first disk comprising; a post bore extending through the first disk; and a rod collar surrounding the post bore; a second disk spaced from the first disk to form a gap, the second disk comprising: a post extending from a first side of the second disk through the post bore and into the rod collar; and a spherical button extending from a second side of the second disk; and a retainer rod comprising a socket coupled to the spherical button, the retainer rod being comprised of a plurality of sections.

The exhaust duct liner suspension system of the preceding paragraph can optionally include, additionally and/or alternatively, any one or more of the following features, configurations, steps and/or additional components:

An exhaust duct liner suspension system and further comprising: a cap coupled to the retainer rod, the cap comprising: a plate for engaging an exhaust duct; a rod bore extending through the plate; and a stiffener collar surrounding the rod bore to retain the plurality of sections.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A hanger for use in a gas turbine engine exhaust system, the hanger comprising:
   a bracket for connection to an exhaust duct liner of the gas turbine exhaust system;
   a washer connected to the bracket at a slip joint;
   a rod connected to the washer at a ball joint; and
   a cap for connecting to an exhaust duct of the gas turbine exhaust system, the cap connected to the rod, wherein the slip joint and the ball joint restrain a first end of the rod in a generally radially direction and permit movement in all other rotational and translational directions, and wherein a second end of the rod is fixed such that the second end of the rod is translationally restrained with respect to the cap and translations of the first end of the rod relative to the second end of the rod are rotationally restrained at the second end.

2. The hanger of claim 1 wherein the bracket comprises:
   a platform; and
   a slide bore extending through the platform and to which the washer is connected.

3. The hanger of claim 2 wherein the bracket further comprises:
   a plurality of legs extending from the platform; and
   a plurality of feet spaced from the platform by the plurality of legs.

4. The hanger of claim 2 wherein the washer comprises:
   an first disk adjacent a first side of the platform;
   a post extending from the first disk through the slide bore;
   a second disk adjacent a second side of the platform;
   a post bore extending through the second disk and surrounding the post;
   wherein the second disk is spaced from the first disk and the slide bore is wider than the post to form the slip joint.

5. The hanger of claim 4 wherein the second disk further comprises a post collar surrounding the post.

6. The hanger of claim 1 wherein:
   the washer includes a radially outwardly extending spherical button; and
   the rod includes a radially inwardly extending socket that receives the spherical button to form the ball joint.

7. The hanger of claim 6 wherein the rod comprises:
   a pair of rod sections each forming a portion of the socket; and
   a retainer that holds the pair of rod sections together.

8. The hanger of claim 7 wherein the retainer is selected from the group consisting of a rod cap and a clip, wherein the rod cap forms a resilient hinge between the rod sections, and wherein the clip applies a spring-force to the rod sections to cause mutual engagement therebetween.

9. The hanger of claim 1 wherein the rod is threaded into the cap.

10. The hanger of claim 1 wherein the cap comprises:
    a plate for engaging the exhaust duct;
    a rod bore extending through the plate; and
    a collar surrounding the rod bore to receive the rod.

11. A suspension system comprising:
    an exhaust duct of a gas turbine engine;
    an exhaust duct liner disposed within the exhaust duct;
    a rod comprising:
       a first end having a threaded shaft; and
       a second end having a socket, wherein the first end is fixed such that the first end is translationally restrained with respect to the exhaust duct and translations of the second end of the rod relative to the first end of the rod are rotationally restrained at the first end;
    a washer comprising:
       a first plate having a button joined to the socket to form a ball joint; and
       a second plate spaced from the first plate to define a gap;
    a bracket joined to the exhaust duct liner, the bracket having a slide bore inserted into the gap, wherein the washer is joined to the bracket to form a slip joint, and wherein the ball joint and the slip joint are disposed at the same end of the rod; and a cap joined to the exhaust duct, the cap having a rod collar that receives the rod.

12. The suspension system of claim 11 wherein the bracket comprises:
a platform through which the slide bore extends;
a plurality of legs extending from the platform; and
a plurality of feet spaced from the platform by the plurality of legs.

13. The suspension system of claim 11 wherein the washer further comprises:
a post extending from the first plate opposite the button;
a bore extending through the second plate and surrounding the post; and
a post collar on the second plate surrounding the bore;
wherein the post is joined to the post collar to define the gap.

14. The suspension system of claim 11 wherein the rod comprises:
a pair of circumferential rod sections each forming a portion of the socket and the threaded end; and
a retainer that holds the pair of rod sections together;
wherein the pair of rod sections are threaded into the rod collar.

15. The suspension system of claim 11 wherein the cap comprises:
a plate fastened to the exhaust duct; and
a bore extending through the plate around which the rod collar is disposed.

16. A method for assembling a suspension system for hanging and exhaust duct liner within an exhaust duct of a gas turbine engine, the method comprising:
joining a spherical button to a liner bracket at a slip joint;
coupling a socket of a rod to the spherical button, wherein the socket is disposed at a first end of the rod to form a sliding ball joint; and
threading a cap around the rod, wherein the cap is disposed at a second end of the rod that is fixed such that the second end of the rod is translationally restrained relative to the exhaust duct and translations of the first end of the rod relative to the second end of the rod are rotationally restrained at the second end of the rod.

17. The method of claim 16 and further comprising:
joining the liner bracket to studs of an exhaust duct liner; and
joining the cap to the exhaust duct with fasteners.

18. The method of claim 16 and further comprising:
splitting the rod to fit the spherical button into the socket.

19. The method of claim 16 and further comprising:
pre-assembling a washer to the bracket by joining opposing plates to opposite sides of the bracket.

20. An exhaust duct liner suspension system comprising:
a washer comprising:
a first disk comprising:
a post bore extending through the first disk; and
a rod collar surrounding the post bore;
a second disk spaced from the first disk to form a gap, the second disk comprising:
a post extending from a first side of the second disk through the post bore and into the rod collar; and
a spherical button extending from a second side of the second disk;
wherein the first and second disks couple the washer to a support to form a sliding joint; and
a retainer rod comprising a socket coupled to the spherical button to form a ball joint, the retainer rod being comprised of a plurality of sections, wherein the ball joint and sliding joint are disposed at a first end of the rod, and wherein a second end of the rod is fixed such that the second end of the rod is translationally restrained and translations of the first end of the rod relative to the second end of the rod are rotationally restrained at the second end of the rod.

21. The exhaust duct liner suspension system of claim 20 and further comprising:
a cap coupled to the retainer rod, the cap comprising:
a plate for engaging an exhaust duct;
a rod bore extending through the plate; and
a stiffener collar surrounding the rod bore to retain the plurality of sections.

* * * * *